Nov. 8, 1960 — M. D. TUPPER ET AL — 2,959,696
BEARING ASSEMBLY
Filed July 28, 1958 — 2 Sheets-Sheet 1
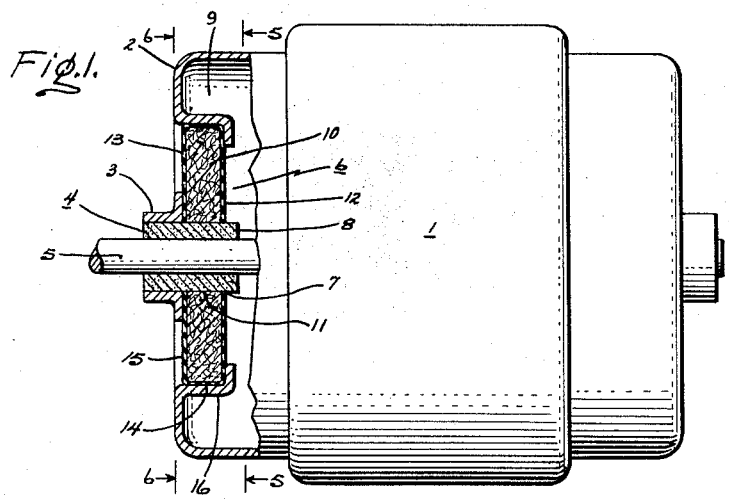
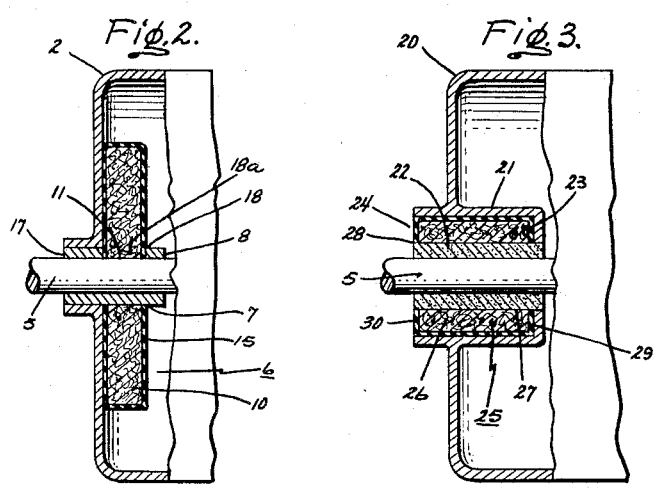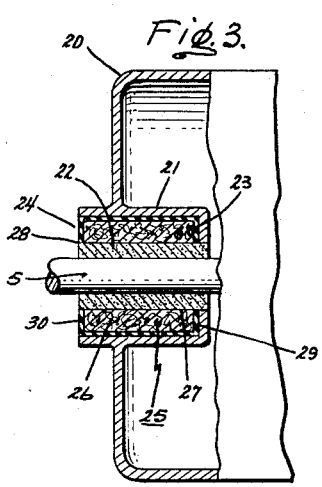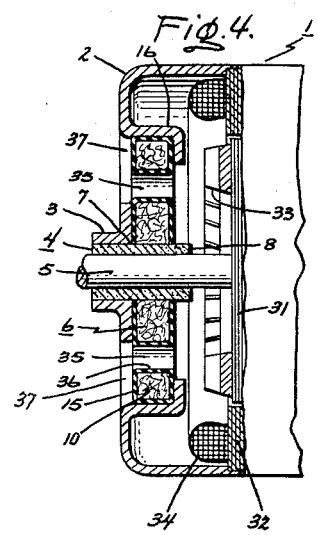
Inventors:
Karl M. Feiertag,
Myron D. Tupper;
by H. F. Manbeck, Jr.
Attorney.

Nov. 8, 1960  M. D. TUPPER ET AL  2,959,696
BEARING ASSEMBLY
Filed July 28, 1958  2 Sheets-Sheet 2
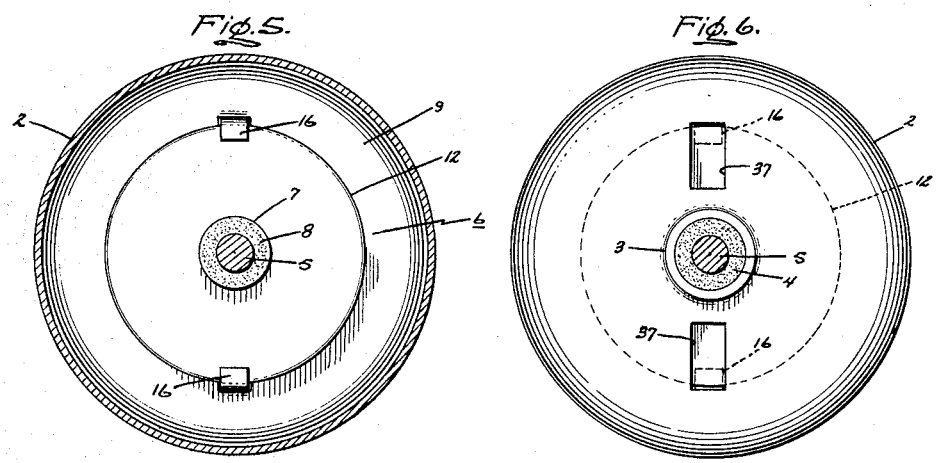
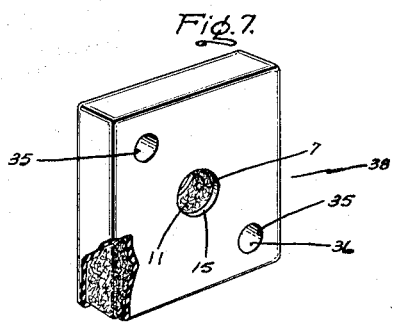
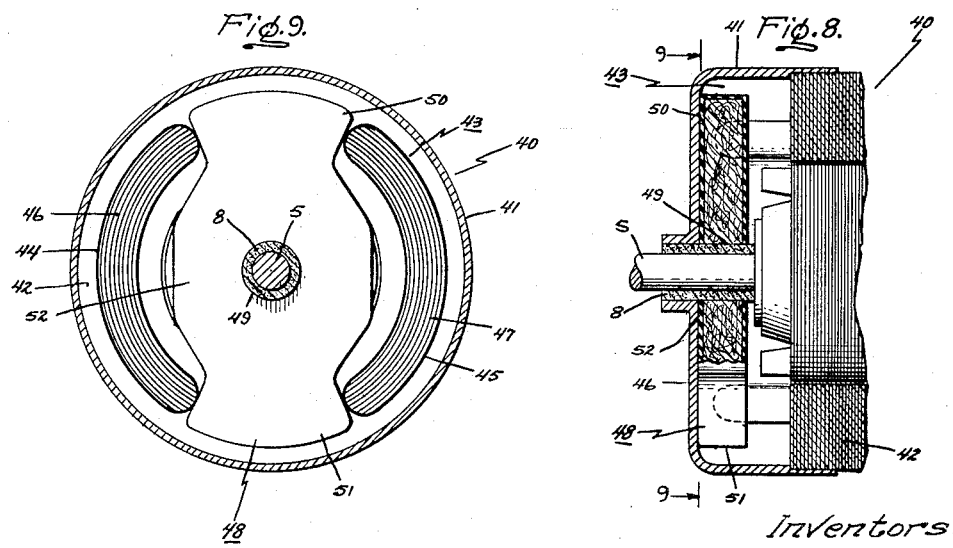
Inventors:
Karl M. Feiertag,
Myron D. Tupper,
by H. F. Manbeck, Jr.
Attorney.

United States Patent Office 2,959,696
Patented Nov. 8, 1960

2,959,696

BEARING ASSEMBLY

Myron D. Tupper and Karl M. Feiertag, Fort Wayne, Ind., assignors to General Electric Company, a corporation of New York Filed July 28, 1958, Ser. No. 751,254

16 Claims. (Cl. 310—90)

This invention relates generally to bearing assemblies and more particularly to sleeve bearings and the lubrication system therefor.

Sleeve bearings (as distinguished from roller and ball bearings which are conventionally referred to as antifriction bearings) commonly comprise an elongated cylindrical bearing sleeve having at least its inner surface, referred to as the bearing surface, formed of suitable bearing material; the bearing sleeve rotatably supports a shaft, the surface of the shaft which engages the bearing surface being referred to as the journal surface. It is generally necessary to furnish a supply of lubricant, such as oil, to the bearing and thus, a lubricant reservoir is commonly associated with the bearing for supplying lubricant thereto. Some sleeve bearings are entirely formed of porous metal, such as sintered bronze, the lubricant passing through the bearing by capillary action and thus onto the journal surface of the shaft. In another common form of sleeve bearing, an opening is formed in a wall of the bearing communicating with the journal surface of the shaft for feeding the lubricant thereto. In both types of sleeve bearings, the lubricant reservoir is commonly filled with lubricant absorbent material, such as felt, which has a wick portion contacting the surface of the porous bearing or extending through the opening in the bearing wall to contact the journal surface of the shaft. This lubricant absorbent material holds a supply of lubricant, releasing the same to the bearing as needed by capillary action. In another common lubricating arrangement for sleeve bearings, the lubricant absorbent material contacts the shaft at an end of the bearing, the lubricant being deposited thereon being carried along the journal surface of the shaft by pumping grooves cut in the journal surface of the shaft bearing surface.

In the manufacture of small rotating apparatus having sleeve bearings, especially electric motors in the sub-fractional horsepower frame sizes, an efficient low-cost lubricant reservoir to supply lubricant to the bearing is highly desirable. Prior art lubricant reservoirs for such motors known to the present applicants have consisted of conventional felt wicks or washers which have in turn necessitated the provision of a closure to hold the lubricant absorbent material in place, to protect it from dirt, dust and foreign matter, to reduce the rate of lubricant evaporation, and to prevent the creepage of lubricant to the surrounding surfaces of the motor. In order to perform these functions satisfactorily, the wick enclosures have conventionally consisted of several parts sealed at their junctions with the other parts of the motor by means of a lubricant-proof sealer or gasket. Prior art lubricant systems for small motors have therefore commonly required the use of several parts to form the lubricant reservoir closure, such parts commonly requiring hand assembly and thus adding appreciably to the over-all cost of the motor. It is therefore desirable to provide a sleeve bearing assembly incorporating a lubrication system comprising a minimum number of parts and in which the closure commonly required mechanically to hold the lubricant absorbent material in place is eliminated.

It is accordingly an object of our invention to provide an improved bearing assembly.

Another object of our invention is to provide an improved lubrication system for bearings.

A further object of our invention is to provide an improved lubricant reservoir for sleeve bearings in which the mechanical closures previously required are eliminated.

Yet another object of our invention is to provide an improved lubricant reservoir for sleeve bearings which will accommodate a larger supply of lubricant than prior lubricant reservoirs known to the present applicants.

Further objects and advantages of our invention will become apparent by reference to the following description and the accompanying drawings, and the features of novelty which characterize this invention will be pointed out with particularity in the claims annexed to and forming a part of this specification.

Our invention in its broader aspects provides a unitary lubricant reservoir comprising a body of lubricant absorbent material having a part adapted intimately to contact a member to which the lubricant is to be fed, all of the surface area of the body with the exception of the contacting part thereof having an imperforate covering formed of thin lubricant-impervious and resistant, pliable material, preferably an elastomeric material. By a lubricant impervious and resistant material we mean a material which will not allow the escape of lubricant therethrough and which will not deteriorate under constant exposure to lubricant. In a preferred embodiment of our invention, we provide a bearing assembly comprising a bearing member having a shaft member rotatably journaled therein, and for lubricating this assembly we provide a unitary lubricant reservoir as generally defined above and specifically comprising a relatively thick generally flat body of lubricant absorbent material, such as felt, with a transverse opening extending therethrough with both sides and the peripheral edge of the body to the exclusion of the wall of the opening therein having a relatively thin imperforate covering or coating of lubricant impervious and resistant pliable material, such as synthetic rubber. The reservoir, which is preferably self-supporting by virtue of the coating, is positioned with one of the bearing and shaft members extending through the body opening and in intimate contact with the wall thereof so that the body feeds lubricant to the one member.

In the drawings, Fig. 1 is a side-elevational view, partly in cross-section and partly broken away, illustrating a small electric motor having a porous sleeve bearing and incorporating one form of our improved lubricant reservoir;

Fig. 2 is a fragmentary side-elevational view, partly in section and partly broken away, showing the application of the improved lubricant reservoir of our invention to a rotating machine having a conventional sleeve bearing with an opening therein communicating with the journal surface of the shaft;

Fig. 3 is another fragmentary side-elevational view, partly in section and partly broken away, showing the application of the improved lubricant reservoir of our invention to another form of bearing assembly;

Fig. 4 is yet another fragmentary side-elevational view partly in section and partly broken away showing a modified form of our improved lubricant reservoir;

Fig. 5 is a cross-sectional view taken on the line 5—5 of Fig. 1;

Fig. 6 is a cross-sectional view on the line 6—6 of Fig. 1;

Fig. 7 is a view in perspective showing one form of the lubricant reservoir in accordance with our invention suitable for use in the embodiment of Fig. 4;

Fig. 8 is a side-elevational view, partially in section and partially broken away, showing a small electric motor having another form of our improved lubricant reservoir incorporated therein; and Fig. 9 is a cross-sectional view taken on the line 9—9 of Fig. 8.

Referring now to Figs. 1, 5 and 6 of the drawings, there is shown a small electric motor, generally identified as 1, including an end shield 2 having a hub portion 3 which supports a sintered porous bronze sleeve bearing 4. Sleeve bearing 4 in turn has shaft 5 of the motor 1 rotatably journaled therein. In accordance with our invention, we provide a unitary self-supporting lubricant reservoir 6 having a transverse opening 7 formed therethrough, reservoir 6 being snugly fitted over portion 8 of sleeve bearing 4 which extends into cavity 9 formed by end shield 2.

Our improved lubricant reservoir 6 is formed on a relatively thick flat body portion 10 of lubricant absorbent material, such as felt and in the embodiment of Figs. 1, 5 and 6, lubricant reservoir 6 and lubricant absorbent body 10 have an annular configuration. Further in accordance with our invention, all of the surfaces of body portion 10 with the exception of the wall 11 of transverse opening 7, i.e., sides 12 and 13 and peripheral edge 14 have an integral, relatively thin coating or covering 15 of lubricant impervious and resistant pliable material, preferably an elastomeric material, such as synthetic rubber. Lubricant reservoir 6 is self-supporting by virtue of its integral coating 15 and thus may be retained in its assembled position on extension portion 8 of bearing 4 and abutting the inner surface of end shield 2 by means of a pair of small tabs 16 formed from end shield 2 as shown. It will be seen that wall 11 of opening 7 in lubricant absorbent body 10 intimately contacts the outer surface of extension portion 8 of bearing 4 thus feeding lubricant thereto; we prefer normally to form opening 7 in lubricant reservoir 6 so that its diameter is slightly smaller than the outside diameter of extension portion 8 of bearing 4 so that lubricant reservoir 6 is assembled onto extension portion 8 of bearing 4 with an interference fit, thereby insuring intimate contact between wall 11 of body 10 and the outer surface of bearing extension portion 8, and further providing a seal between the openings 7 in the coating 15 and the outer surface of the bearing extension portion 8 to prevent creepage of lubricant from the body 10 along the exterior surface of bearing extension portion 8.

The lubricant absorbent body 10 may be filled or loaded with suitable lubricant for the bearing assembly, for example, lubricating oil, in a plurality of ways. In one method of loading the body 10, it is saturated by submerging it in a pool of lubricant prior to its assembly on the motor, any excess lubricant being removed after the submersion step by a centrifugal spinning operation. Alternately, the body 10 may be assembled on the motor in a dry state and then be filled by hypodermic type, needle injection means. In other words it may be filled by inserting an injection needle through the covering 15 and passing the lubricant into the body through the needle. It has been found that when the needle is then withdrawn, the elastomeric covering of our preferred embodiment immediately moves together and closes the needle opening by a more or less "puncture proof tire" action.

After the assembly of reservoir 6 on bearing extension portion 8 and its filling either prior to or after assembly, the lubricant is fed to the porous sintered bearing 4 and thence through the pores of the bearing 4 to the journal surface of the shaft 5 by capillary action. The tight fit of the openings 7 in the coating 15 with the outer surface of bearing extension portion 8 acts as an air seal materially hindering the ingress of air to the pad 10 required to replace the lubricant being fed to the bearing, and the impervious coating 15 prevents the entry of air at any point. This drastic reduction in the amount of air allowed to enter the reservoir acts as a meter to control the amount of lubricant supplied to the bearing since, as a general matter, only as air enters can lubricant flow into the bearing. This feature is very desirable since a very small quantity of lubricant is actually required to lubricate adequately a bearing of this type. However, should it be desired to supply an amount of lubricant greater than the completely sealed arrangement will yield, the necessary air may be admitted to the reservoir 6 by providing one or more small breather holes in the cover 15, the amount of lubricant supplied being accurately controllable by varying the size or number of such breather holes.

It will be readily seen that our improved lubricant reservoir completely eliminates the often complex mechanical closures which were previously required, the coating 15 on the lubricant absorbent material body 10 serving as the closure. Furthermore, prior lubricant reservoirs often could not be filled to capacity because at elevated temperatures, a part of the lubricant would be pushed out of the reservoir due to its expansion. This is, however, not true of our improved reservoir with its pliable covering since when the lubricant expands responsive to any increase in temperature, the coating 15 will readily expand or stretch under this very slight pressure without rupturing, and thereby return the lubricant within the reservoir. It may be found desirable in instances where extreme temperature variation may be encountered to laminate the felt body 10 within the covering 15.

It will be readily seen that lubricant absorbent materials other than felt, such as certain cellular plastic materials, may be employed for the body 10 of the reservoir 6, and further that the covering 15 may be formed of various materials besides synthetic rubber, such as, for example, certain vinyl plastics.

Referring now to Fig. 2 in which like parts are illustrated by like reference numerals, we have shown the application of our improved lubricant reservoir 6 to a conventional sleeve bearing 17 which has a window 18 formed in a wall thereof communicating with the journal surface of shaft 5. Sleeve bearing 17, which is supported by a center hub 3 in the motor end shield 2 may be either a babbitt lined bearing or a solid bronze bearing, as is well known in the art. Here again, our improved lubricant reservoir 6 has its transverse opening 7 fitted over extension portion 8 of bearing 17 and in this embodiment the lubricant absorbent body includes a wick portion 18a extending into window 18, whereby the wall 11 of lubricant absorbent body 10 directly and intimately contacts the journal surface of shaft 5 exposed by the window 18, in addition to intimately contacting the remaining surface of extension portion 8 of bearing 17. It will be readily apparent that in the embodiment of Fig. 2, the wick portion 18a projects inwardly from the principal surface of the wall 11 of the transverse opening 7 in reservoir 6, forming an extension of the wall and directly contacting the shaft 5 to feed lubricant thereto. We have found that in many cases the reservoir 6 is sufficiently self-supporting that the provisions of the tabs 16 of Fig. 1 is unnecessary and thus, as shown in Fig. 2, lubricant reservoir 6 will be retained in its proper position on the bearing extension 8 abutting the inner surface of the end shield 2 merely by virtue of its tight fit on the bearing.

Referring now to Fig. 3 in which like parts are still indicated by like reference numerals, it will be seen that our improved lubricant reservoir may be incorporated in existing motor end shield arrangements incorporating a lubricant reservoir closure which would normally be filled with suitable wicking or packing material and which would normally require an additional closure member. Here, there is shown an end shield 20 having a lubricant reservoir closure member 21 supporting a sleeve bearing 22 therein, shown here as being a sintered porous bronze bearing. It will be seen that the closure portion 21 of the end shield 20 defines a cavity 23 with the bearing 22, this cavity normally being filled with suitable wicking or packing material and its open end 24 normally thereafter closed with a suitable closure member. Here, we provide an annular lubricant reservoir member 25 which is assembled over the bearing 22 completely filling the cavity 23, lubricant reservoir 25 again comprising an annular body portion 26 formed of lubricant absorbent material with its exterior surfaces, to the exclusion of wall 27 of its central opening 28, having a relatively thin integral coating or covering 29 of lubricant impervious and resistant pliable material, preferably elastomeric material. The central opening 28 of reservoir 25 should again have a slight interference fit with the outer surface of bearing 22 so that the wall 27 of lubricant absorbent material body 26 intimately contacts the outer surface of bearing 28 and so that the coating 29 on end 30 thereof forms a tight seal with the outer surface of bearing 22. It is thus seen that the previous requirement for a separate closure member to close open end 24 of cavity 23 is eliminated.

Referring now to Fig. 4 in which like parts are still indicated by like reference numerals, the motor 1 is shown as being an alternating current induction motor with a rotor 31, which may be of the cast squirrel cage type, mounted on a shaft 5 concentrically within a stator core member 32 which has a conventional winding 34 arranged thereon. Rotor 31 is shown as having a cast short-circuiting end ring formed thereon with integrally cast fan blades 33 extending axially outwardly therefrom, as is well known in the art. In prior motor constructions of this type, known to the present applicants, incorporating conventional bearing assemblies, optimum use of such a cast end ring fan has not been possible since the bearing assembly including the lubricant reservoir was too large; such large lubricant reservoir assemblies were necessary in order to provide the requisite lubricant capacity. With such prior bearing and lubricant reservoir assemblies, it was necessary that the air intake openings be disposed outwardly from the bearing and lubricant reservoir assembly with the result that such openings were generally outside of the fan diameter. In accordance with our invention, lubricant reservoir 6 is provided with a plurality of transverse openings 35 extending axially therethrough radially outwardly from the center opening 7 by which the lubricant reservoir 6 is mounted on extension portion 8 of bearing 4, with the integral coating or covering 15 extending through the openings 35 on the walls thereof, as shown at 36. Thus, with our improved lubricant reservoir arrangement, as shown in Fig. 4, air intake openings may be provided through the lubricant reservoir having the proper relationship to the fan blades 33 for optimum efficiency. It will be seen in Fig. 4 that the air intake openings 35 may communicate with the openings 37 in end shield 2 from which the tabs 16 have been formed. In instances in which the tabs 16 are not used to mount the reservoir 6, but rather a solid end shield is provided (as in Fig. 2), suitable openings may be punched or otherwise formed in the end shield 2 communicating with the openings 35 in the lubricant reservoir 6.

Referring now to Fig. 7, it will be seen that with our improved encapsulated lubricant reservoir arrangement, it is not required that the lubricant reservoir have an annular configuration and, for example, as shown in Fig. 7, the lubricant reservoir 38 may be rectangular if desired; lubricant reservoir 38 of Fig. 7 is shown as including two transverse openings 35 in addition to the central opening 7, the transverse openings 35 having their walls covered with the integral pliable coating 15, as shown at 36. It will be readily understood that openings 35 may serve not only as air intake openings, but also may be utilized to accommodate external electrical leads or mechanical mounting arrangements, such as through bolts.

Referring now to Figs. 8 and 9, it will be seen that our improved lubricant reservoir arrangement may be suitably contoured so as substantially to fill available space and thus substantially to increase the lubricant storage capacity. Thus, in Fig. 7 there is shown a two pole single phase alternating current motor 40 having an outer shell 41 within which stator core member 42 is positioned. Stator core member 42 has a winding 43 disposed thereon, winding 43 being shown as having two coils 44 and 45 respectively forming two magnetic poles. As is well known in the art, coils 44 and 45 have their end turns 46 and 47 extending axially beyond core 42. Here, lubricant reservoir 48 which in cross-section resembles lubricant reservoir 6 of Fig. 1, has its central opening 49 embracing the outer surface of porous bearing 8. The reservoir, of course, feeds the lubricant therein to the outer surface of the bearing and it then passes through the bearing by capillary action to form a lubricant film between the inner surface of the bearing and the shaft. Here, lubricant reservoir 48 has two portions 50 and 51 which respectively extend into the spaces between the end turns 46 and 47 of winding 43, substantially filling the same, and its center portion 52 is likewise formed substantially to fill the space interiorly of the end turns 46 and 47. It will thus be seen that our improved lubricant reservoir arrangement may be suitably and easily contoured so as substantially to fill any available space, a possibility which was nonexistent in prior bearing and lubricant reservoir assemblies known to the present applicants.

In a typical 1/50 horsepower motor incorporating the embodiment of our invention shown in Fig. 1, the lubricant reservoir 6 has a diameter of 2 inches, a thickness of 1/4 inch with its central opening 7 having a diameter of 0.44 inch. In this exemplary application the body portion 10 is stamped from felt, the coating 15 is then applied as by spraying, and the central opening 7 is then punched. It will be readily understood that the relatively thin pliable, preferably elastomeric, lubricant impervious and resistant coating or covering 15 may be equally advantageously applied by other means, for example by surface coating or by dipping.

It will now be seen that we have provided an improved bearing assembly and most particularly an improved lubricant reservoir for bearing assemblies which provides a complete positive enclosure for the lubricant thus completely eliminating the mechanical lubricant reservoir closures formerly required. Our improved lubricant reservoir arrangement further permits the supply of a metered quantity of lubricant to the bearing or journal surface of the shaft, permits the provision of openings therethrough for air intake purposes or for accommodating electrical leads or through bolts, and further permits it being contoured in any desired configuration so as substantially to utilize the available space thereby to provide the greatest possible lubricant storage.

While we have shown and described particular embodiments of our invention, further modifications and improvements will occur to those skilled in the art and we desire, therefore, in the appended claims, to cover all modifications which do not depart from the spirit and scope of our invention.

What we claim as new and desire to secure by Letters Patent of the United States is as follows:

1. A bearing assembly comprising: a bearing member having a surface supporting a complementary surface of another member for relative movement therebetween; and a unitary lubricant reservoir comprising a body of lubricant absorbent material having a surface thereof intimately contacting at least one of said members for feeding lubricant thereto, all of the surface area of said body with the exception of said surface having a covering formed of thin lubricant-impervious and resistant pliable material.

2. A bearing assembly comprising: a bearing member having a shaft member rotatably journaled therein; and a unitary lubricant reservoir comprising a body of lubricant absorbent material having a part thereof intimately contacting at least one of said members for feeding lubricant thereto, all of the surface area of said body with the exception of said part having an integral covering formed of thin lubricant impervious and resistant elastomeric pliable material.

3. In a bearing assembly having a bearing member and a shaft member rotatably journaled in said bearing member; a unitary lubricant reservoir comprising a body of lubricant absorbent material with an opening formed therethrough, all of the surface area of said body with the exception of the wall of said opening having a covering formed of thin lubricant impervious and resistant pliable material, said reservoir being arranged with one of said members extending through said body opening and intimately contacting said wall thereof whereby said body feeds lubricant to said one member.

4. In a bearing assembly having a bearing member and a shaft member rotatably journaled in said bearing member; a unitary self-supporting lubricant reservoir comprising a relatively thick generally flat body of lubricant absorbent material with a transverse opening extending therethrough, both sides and the peripheral edge of said body to the exclusion of the wall of said opening having a relatively thin integral coating of lubricant impervious and resistant pliable elastomeric material, said reservoir being positioned with one of said members extending through said body opening and in intimate contact with said wall thereof whereby said body feeds lubricant to said one member.

5. A bearing assembly comprising: a sleeve bearing formed of porous material and having a shaft rotatably journaled therein; and a unitary self-supporting lubricant reservoir comprising a relatively thick generally flat body of lubricant absorbent material with a transverse opening extending therethrough, both sides and the peripheral edge of said body to the exclusion of the wall of said opening having a relatively thin covering of lubricant impervious and resistant pliable material, said reservoir being positioned with said bearing extending through said body opening and in intimate contact with said wall thereof whereby said body feeds lubricant to said bearing.

6. A bearing assembly comprising: a sleeve bearing having a shaft rotatably journaled therein, said bearing having an opening formed in its wall communicating with the journal surface of said shaft; and a unitary self-supporting lubricant reservoir comprising a relatively thick generally flat body of lubricant absorbent material with a transverse opening extending therethrough, both sides and the peripheral edge of said body to the exclusion of the wall of said opening having a relatively thin covering of lubricant impervious and resistant pliable material, said reservoir being positioned with said bearing extending through said body opening so that the wall of said opening intimately contacts the portion of said journal surface of said shaft exposed by said bearing opening whereby said body feeds lubricant to said shaft journal surface.

7. A bearing assembly comprising: a bearing member, a shaft member rotatably journaled in said bearing member; and a unitary self-supporting lubricant reservoir comprising a relatively thick generally flat body of lubricant absorbent material with at least two transverse openings extending therethrough, both sides and the peripheral edge and the wall of one of said openings in said body to the exclusion of the wall of the other opening having a relatively thin covering of lubricant impervious and resistant pliable material, said reservoir being positioned with one of said members extending through said other body opening and in intimate contact with the wall thereof whereby lubricant is fed to said one member.

8. In a rotating machine: a bearing member having a shaft member rotatably journaled therein; a frame having a portion supporting said bearing and extending radially outward therefrom; and a unitary self-supporting lubricant reservoir comprising a relatively thick generally flat body of lubricant absorbent material with a transverse opening extending therethrough, both sides and the peripheral edge of said body to the exclusion of the wall of said opening having a relatively thin integral coating of lubricant impervious and resistant elastomeric material, said reservoir being positioned with one of said members extending through said body opening and in intimate contact with the wall thereof whereby said body feeds lubricant to said one member, one side of said lubricant reservoir abutting one side of said frame.

9. In a rotating machine: a bearing member having a shaft member rotatably journaled therein; a frame having a portion supporting said bearing and extending radially outward therefrom; and a unitary self-supporting lubricant reservoir comprising a relatively thick generally flat body of lubricant absorbent material with a transverse opening extending therethrough, both sides and the peripheral edge of said body to the exclusion of the wall of said opening having a relatively thin covering of lubricant impervious and resistant pliable material, said reservoir being positioned with one of said members extending through said body opening and in intimate contact with the wall thereof whereby said body feeds lubricant to said one member, one side of said lubricant reservoir abutting one side of said frame; said frame having at least one tab portion formed therefrom engaging the other side of said lubricant reservoir and retaining the same in assembled relation on said one member.

10. In a rotating machine: a bearing member having a shaft member rotatably journaled therein; a frame having a portion supporting said bearing and extending radially outward therefrom; and a unitary self-supporting lubricant reservoir comprising a relatively thick generally flat body of lubricant absorbent material with at least two transverse openings extending therethrough, both sides and the peripheral edge and the wall of one opening in said body to the exclusion of the wall of the other opening having a relatively thin integral coating of lubricant impervious and resistant pliable material, said reservoir being positioned with one of said members extending through said other body opening and in intimate contact with the wall thereof whereby said lubricant is fed to said one member, said frame having at least one opening formed therein communicating with said one body opening of said lubricant reservoir.

11. In a rotating machine: a bearing member having a shaft member rotatably journaled therein; a frame having a portion supporting said bearing and extending radially outward therefrom; a unitary self-supporting lubricant reservoir comprising a relatively thick generally flat body of lubricant absorbent material with at least two transverse openings extending therethrough, both sides and the peripheral edge and the wall of one opening in said body to the exclusion of the wall of the other opening having a relatively thin integral coating of lubricant impervious and resistant pliable material, said reservoir being positioned with one of said members extending through said other body opening and in intimate contact with the wall thereof whereby said lubricant is fed to said one member, said frame having at least one opening formed therein communicating with said one body opening of said lubricant reservoir; and means including a fan mounted on said shaft on the same side of said frame as said lubricant reservoir and spaced therefrom, said fan having blade elements extending radially outwardly beyond said one body opening of said lubricant reservoir.

12. In a dynamoelectric machine: a frame; a stator core member mounted in said frame, said stator core member having a winding thereon comprising at least a pair of coils respectively forming a corresponding number of poles, said coils respectively having end turns extending axially beyond said stator core member; a bearing member, a shaft member for said machine rotatably journaled in said bearing member; said frame having a portion supporting said bearing member and forming an enclosure with said end turns at one end of said stator core member; and a unitary self-supporting lubricant reservoir comprising a relatively thick generally flat body of lubricant absorbent material with a transverse opening extending therethrough, both sides and the peripheral edge of said body to the exclusion of the wall of said opening having a relatively thin covering of lubricant impervious and resistant pliable material, said reservoir being positioned in said enclosure with one of said members extending through said opening and in intimate contact with the wall thereof whereby lubricant is fed from said body to said one member, said reservoir having portions extending radially outwardly respectively between said end turns and having a central area generally filling the space interiorly of said end turns.

13. For use with a bearing assembly: a unitary lubricant reservoir comprising a body of lubricant absorbent material having a portion thereof adapted to feed lubricant to said bearing assembly, all of the surface area of said body with the exception of said portion having a covering formed of thin lubricant impervious and resistant pliable material.

14. For use with a bearing assembly: a unitary lubricant reservoir comprising a body of lubricant absorbent material with an opening formed therethrough adapted to contact a part of said bearing assembly and to feed lubricant thereto, all of the surface area of said body with the exception of the wall of said opening having an integral covering formed of thin lubricant impervious and resistant elastomeric material.

15. For use with a bearing assembly; a unitary lubricant reservoir comprising a relatively thick generally flat body of lubricant absorbent material with a transverse opening extending therethrough adapted to contact a part of said bearing assembly and to feed lubricant thereto, both sides and the peripheral edge of said body to the exclusion of the wall of said opening having a relatively thin covering of lubricant impervious and resistant pliable material.

16. For use with a bearing assembly; a unitary self-supporting lubricant reservoir comprising a relatively thick generally flat body of lubricant absorbent material with at least two transverse openings extending therethrough, one of said openings being adapted to embrace a part of said bearing assembly for feeding lubricant thereto, both sides and the peripheral edge and the wall of the other opening of said body to the exclusion of the wall of said one opening having a relatively thin integral coating of lubricating impervious and resistant pliable material.

References Cited in the file of this patent

UNITED STATES PATENTS

| | | |
|---|---|---|
| 1,896,972 | Redmond | Feb. 7, 1933 |
| 2,223,872 | McWhorter et al. | Dec. 3, 1940 |
| 2,306,743 | Morrill | Dec. 29, 1942 |
| 2,850,336 | Dochterman | Sept. 2, 1958 |